(12) United States Patent
Phatak et al.

(10) Patent No.: US 12,202,399 B2
(45) Date of Patent: Jan. 21, 2025

(54) METHODS AND APPARATUS FOR COMMUNICATING USING HEADLIGHTS OF A VEHICLE

(71) Applicant: Nuro, Inc., Mountain View, CA (US)

(72) Inventors: Amey M. Phatak, San Jose, CA (US); John David West, San Anselmo, CA (US); Kyungmin Kim, San Francisco, CA (US); David Doellstedt, Mountain View, CA (US)

(73) Assignee: NURO, INC., Mountain View, CA (US)

( * ) Notice: Subject to any disclaimer, the term of this patent is extended or adjusted under 35 U.S.C. 154(b) by 164 days.

(21) Appl. No.: 18/047,894

(22) Filed: Oct. 19, 2022

(65) Prior Publication Data
US 2023/0143895 A1 May 11, 2023

Related U.S. Application Data

(60) Provisional application No. 63/276,130, filed on Nov. 5, 2021.

(51) Int. Cl.
*B60Q 1/48* (2006.01)
*B60Q 1/26* (2006.01)
*B60Q 1/50* (2006.01)

(52) U.S. Cl.
CPC ............ *B60Q 1/486* (2013.01); *B60Q 1/2603* (2013.01); *B60Q 1/543* (2022.05)

(58) Field of Classification Search
CPC .......... B60Q 2300/054; B60Q 2300/00; B60Q 2300/05; B60Q 2300/116; B60Q 1/543; B60Q 1/2603; B60Q 1/507; B60Q 2400/30
See application file for complete search history.

(56) References Cited

U.S. PATENT DOCUMENTS

| 5,691,696 | A | 11/1997 | Mazies et al. | |
|---|---|---|---|---|
| 5,877,681 | A | 3/1999 | Williams et al. | |
| 8,992,056 | B2 | 3/2015 | Lin et al. | |
| 11,345,276 | B2 * | 5/2022 | Kareem | B60Q 1/486 |
| 11,462,113 | B2 * | 10/2022 | Austin | B60Q 1/507 |
| 11,584,397 | B2 * | 2/2023 | Lee | G06V 40/20 |
| 11,614,214 | B2 * | 3/2023 | Walter | F21S 41/657 |
| | | | | 362/465 |

(Continued)

OTHER PUBLICATIONS

Kessels, Casper, "The eHMI: How Autonomous Cars Will Communicate With the Outside World" [online], [retrieved on Oct. 6, 2022], <https://www.theturnsignalblog.com/blog/ehmi/>.

*Primary Examiner* — Arman B Fallahkhair
(74) *Attorney, Agent, or Firm* — Edell, Shapiro & Finnan, LLC

(57) ABSTRACT

According to one aspect, headlights of a vehicle are used to communicate information that may be understood by a user or other person in the vicinity of the vehicle. A method includes operating a vehicle and determining a status of the vehicle. The vehicle has a park gear arranged to be engaged to cause the vehicle to be in a parked state, and the vehicle includes a first optical assembly that has a first optical arrangement and a first optical controller. The method also includes causing the first optical arrangement to visually communicate a first indication, the first indication being arranged to indicate the status of the vehicle.

16 Claims, 14 Drawing Sheets

(56) References Cited

U.S. PATENT DOCUMENTS

| | | | | |
|---|---|---|---|---|
| 11,667,236 | B2* | 6/2023 | Morimura | B60Q 1/5037 |
| | | | | 340/471 |
| 11,807,155 | B2* | 11/2023 | Sturmat | B60Q 1/085 |
| 2022/0390251 | A1* | 12/2022 | Suzuki | B60Q 1/34 |
| 2023/0150343 | A1* | 5/2023 | Snider | B60Q 3/82 |
| | | | | 296/146.16 |
| 2023/0339386 | A1* | 10/2023 | Massa | B60Q 1/14 |
| 2023/0415641 | A1* | 12/2023 | Miller | G01R 31/3646 |
| 2024/0001841 | A1* | 1/2024 | Patnaik | B60W 50/0205 |
| 2024/0042928 | A1* | 2/2024 | Nojiri | B60K 35/00 |

* cited by examiner

101'

METHODS AND APPARATUS FOR COMMUNICATING USING HEADLIGHTS OF A VEHICLE

PRIORITY CLAIM

This patent application claims the benefit of priority under 35 U.S.C. § 119 to U.S. Provisional Patent Application No. 63/276,130, filed Nov. 5, 2021, and entitled "METHODS AND APPARATUS FOR COMMUNICATING USING HEADLIGHTS OF A VEHICLE," which is incorporated herein by reference in its entirety.

TECHNICAL FIELD

The disclosure relates to providing systems for use with autonomous vehicles. More particularly, the disclosure relates to utilizing headlights of a vehicle to communicate information to observers.

BACKGROUND

As the use of autonomous vehicles grows, the volume of interactions between the autonomous vehicles and users of the autonomous vehicles will increase. Facilitating interactions between users, e.g., customers, and autonomous vehicles enhances the experiences of the users. By way of example, the ability of an autonomous vehicle to provide visual cues to a user enables the user to understand a current state of the autonomous vehicle and, hence, interact with the autonomous vehicle accordingly.

BRIEF DESCRIPTION OF THE DRAWINGS

The disclosure will be readily understood by the following detailed description in conjunction with the accompanying drawings in which.

DESCRIPTION OF EXAMPLE EMBODIMENTS

General Overview

Figure 1:
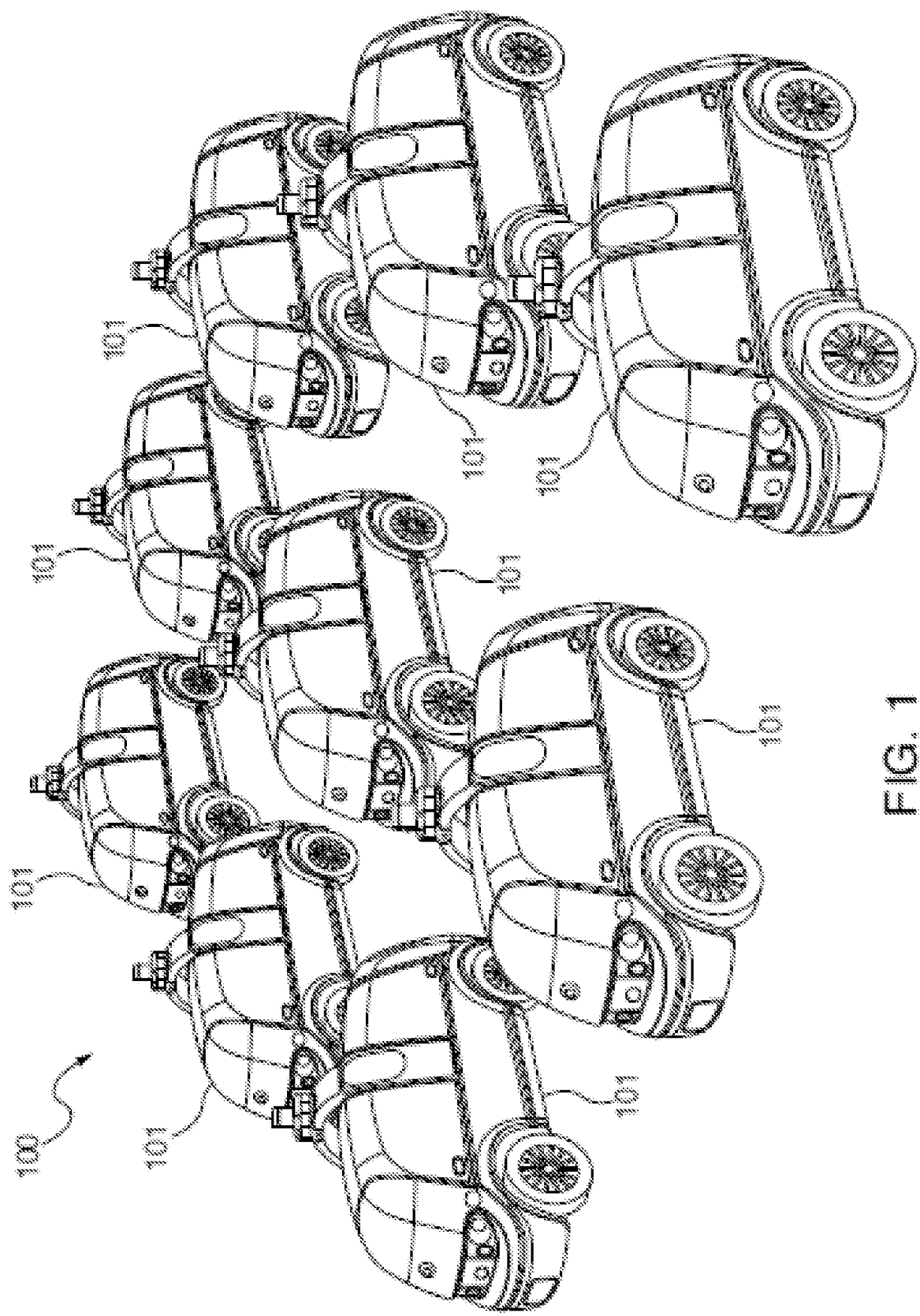
FIG. 1 is a diagrammatic representation of an autonomous vehicle fleet in accordance with an embodiment.

In one embodiment, a method includes operating a vehicle and determining a status of the vehicle. The vehicle has a park gear arranged to be engaged to cause the vehicle to be in a parked state. The vehicle includes a first optical assembly that has a first optical arrangement and a first optical controller. The method also includes causing the first optical arrangement to visually communicate a first indication, the first indication being arranged to indicate the status of the vehicle.

In another embodiment, an apparatus includes a chassis, a propulsion system coupled to the chassis and configured to propel the apparatus, a sensory system coupled to the chassis and configured to obtain data associated with the apparatus, and a processing arrangement coupled to the chassis that processes the data. The apparatus also includes a light system coupled to the chassis, the light system including at least a first optical assembly and at least a first optical controller, wherein the light system is arranged to obtain at least one command from the processing arrangement and to execute the command using the first optical assembly to cause the first optical assembly to communicate a first indication. The apparatus may be a vehicle such as an autonomous vehicle.

According to another embodiment, a vehicle includes a chassis, at least one computing arrangement disposed on the chassis, and a sensor arrangement supported on the chassis. The vehicle also includes a headlight arrangement and a headlight control system. The headlight control system is configured to activate the headlight arrangement to visually convey information.

Headlights of a vehicle are used to communicate information that may be understood by a user of the vehicle or other person in the vicinity of the vehicle. The intensity of light emitted from the headlights may be varied to convey information, and/or patterns created by varying the intensity of the light may also be arranged to convey information. For example, the intensity of light emitted by headlights of a vehicle may be varied between a first level and a second level to simulate a breathing effect for the vehicle to convey to a customer that the vehicle is patiently awaiting an interaction from the customer. By utilizing headlights of a vehicle to communicate information to users, the experience of the users when interacting with the vehicles may be enhanced.

DESCRIPTION

The use of autonomous vehicles is growing and, as a result, the volume of interactions between the autonomous vehicles and users of the autonomous vehicles is increasing. The ability for autonomous vehicles to effectively communicate information to users, e.g., customers receiving deliveries and/or obtaining service from the autonomous vehicles, enhances the experience of the users relative to the autonomous vehicles.

By enabling a vehicle such as an autonomous vehicle to communicate with users, the users may better understand a current state of the vehicle. As a result, the ability for the user to interact appropriately with the vehicle may be enhanced. For example, headlights and/or taillights of a vehicle may be used to communicate information to users, as well as individuals in the vicinity of the vehicle. The intensity light emanating from or emitted by the headlights and/or taillights may be varied to communicate with a user, e.g., a particular intensity level may indicate a particular situation state of a vehicle. Patterns of light emanating from or emitted by the headlights and/or taillights may also be varied to communicate with a user, e.g., a particular pattern and/or intensity may indicate a particular situation or state of a vehicle.

Headlights of a vehicle may generally be used as headlights while the vehicle is in gear and/or operating. By utilizing the headlights to communicate with users while the vehicle is not in gear and/or not operating, the headlights may effectively serve a dual purpose. That is, headlights on a vehicle may be used to enable the vehicle to be seen and/or to illuminate a path in front of the vehicle, as well as to communicate information to users. For example, headlights on a vehicle may be used as daytime running lights while the vehicle is in gear and/or operating.

In one embodiment, when an autonomous delivery vehicle is at a delivery location and awaiting access to compartments of the vehicle by a customer, headlights of the autonomous delivery vehicle may provide an indication that the vehicle is awaiting the customer. In another embodiment, when a vehicle is being electrically charged or otherwise fueled, headlights of the vehicle may provide an indication of a current level of electrical charge in the vehicle.

Referring initially to FIG. 1, an autonomous vehicle fleet which includes vehicles which may convey information using headlights will be described in accordance with an embodiment. An autonomous vehicle fleet 100 includes a plurality of autonomous vehicles 101, or robot vehicles. Autonomous vehicles 101 are generally arranged to transport and/or to deliver cargo, items, and/or goods. Autonomous vehicles 101 may be fully autonomous and/or semi-autonomous vehicles. In general, each autonomous vehicle 101 may be a vehicle that is capable of travelling in a controlled manner for a period of time without intervention, e.g., without human intervention. As will be discussed in more detail below, each autonomous vehicle 101 may include a power system, a propulsion or conveyance system, a navigation module, a control system or controller, a communications system, a processor, and a sensor system.

Dispatching of autonomous vehicles 101 in autonomous vehicle fleet 100 may be coordinated by a fleet management module (not shown). The fleet management module may dispatch autonomous vehicles 101 for purposes of transporting, delivering, and/or retrieving goods or services in an unstructured open environment or a closed environment.

Figure 2:
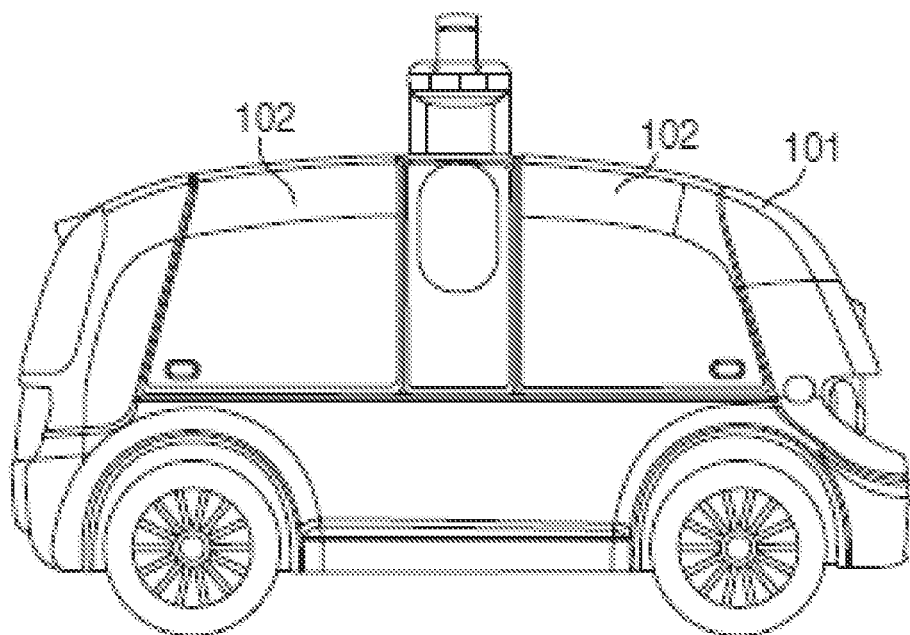
FIG. 2 is a diagrammatic representation of a side of an autonomous vehicle in accordance with an embodiment.

FIG. 2 is a diagrammatic representation of a side of an autonomous vehicle, e.g., one of autonomous vehicles 101 of FIG. 1, in accordance with an embodiment. Autonomous vehicle 101, as shown, is a vehicle configured for land travel. Typically, autonomous vehicle 101 includes physical vehicle components such as a body or a chassis, as well as conveyance mechanisms, e.g., wheels. In one embodiment, autonomous vehicle 101 may be relatively narrow, e.g., approximately two to approximately five feet wide, and may have a relatively low mass and relatively low center of gravity for stability. Autonomous vehicle 101 may be arranged to have a working speed or velocity range of between approximately one and approximately forty-five miles per hour (mph), e.g., approximately twenty-five miles per hour. In some embodiments, autonomous vehicle 101 may have a substantially maximum speed or velocity in range between approximately thirty and approximately ninety mph.

Autonomous vehicle 101 includes a plurality of compartments 102. Compartments 102 may be assigned to one or more entities, such as one or more customer, retailers, and/or vendors. Compartments 102 are generally arranged to contain cargo, items, and/or goods. Typically, compartments 102 may be secure compartments. It should be appreciated that the number of compartments 102 may vary. That is, although two compartments 102 are shown, autonomous vehicle 101 is not limited to including two compartments 102.

Figure 3:
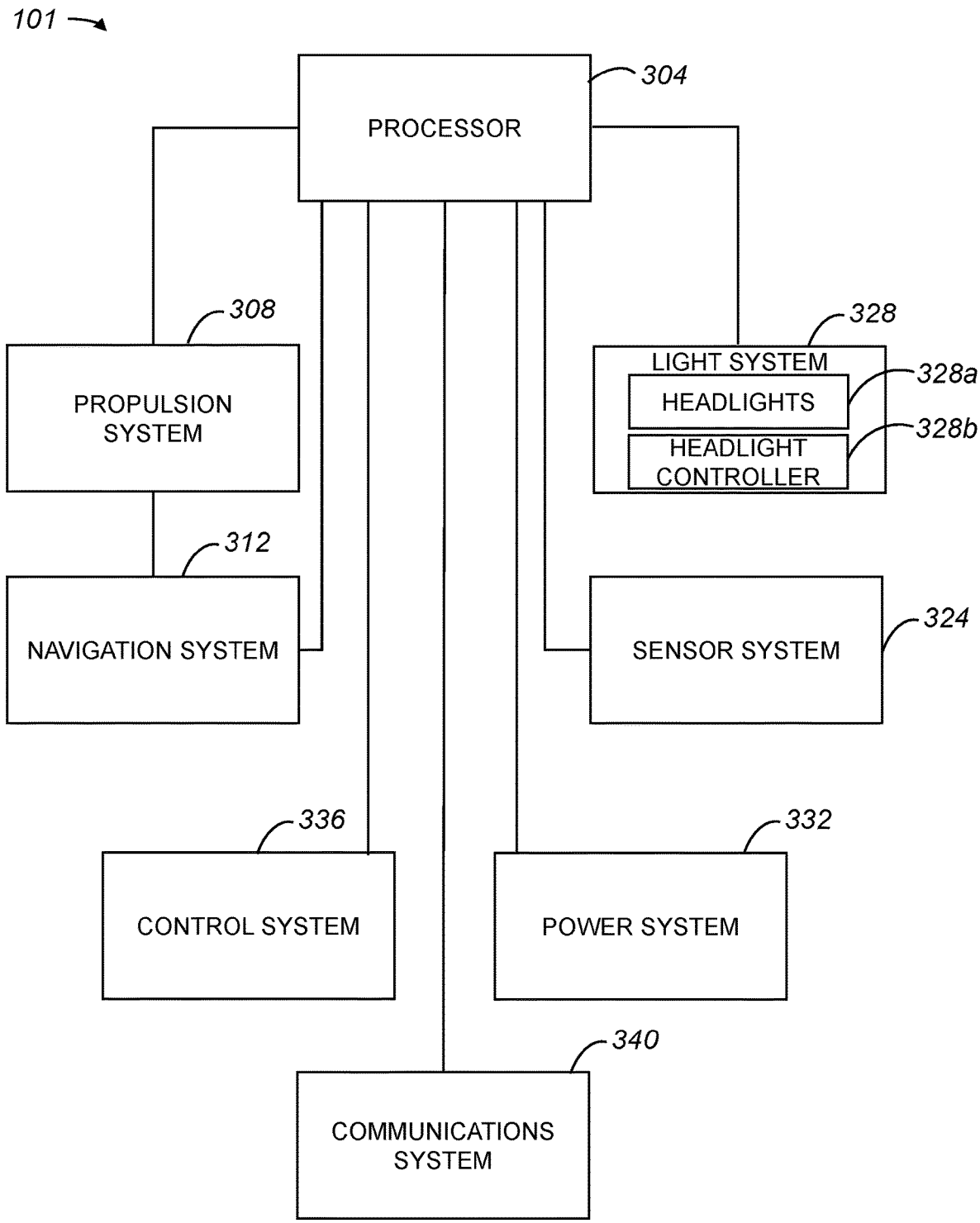
FIG. 3 is a block diagram representation of an autonomous vehicle in accordance with an embodiment.

FIG. 3 is a block diagram representation of an autonomous vehicle, e.g., autonomous vehicle 101 of FIG. 1, in accordance with an embodiment. An autonomous vehicle 101 includes a processor 304, a propulsion system 308, a navigation system 312, a sensor system 324, a light system 328, a power system 332, a control system 336, and a communications system 340. It should be appreciated that processor 304, propulsion system 308, navigation system 312, sensor system 324, light system 328, power system 332, and communications system 340 are all coupled to a chassis or body of autonomous vehicle 101.

Processor 304 is arranged to send instructions to and to receive instructions from or for various components such as propulsion system 308, navigation system 312, sensor system 324, light system 328, power system 332, and control system 336. Propulsion system 308, or a conveyance system, is arranged to cause autonomous vehicle 101 to move, e.g., drive. For example, when autonomous vehicle 101 is configured with a multi-wheeled automotive configuration as well as steering, braking systems and an engine, propulsion system 308 may be arranged to cause the engine, wheels, steering, and braking systems to cooperate to drive. In general, propulsion system 308 may be configured as a drive system with a propulsion engine, wheels, treads, wings, rotors, blowers, rockets, propellers, brakes, etc. The propulsion engine may be a gas engine, a turbine engine, an electric motor, and/or a hybrid gas and electric engine. Propulsion system 308 generally includes gears such as at least one drive gear and a park gear. When a drive gear is active, propulsion system 308 may cause vehicle 101 to drive. When a park gear is active, engaged, or otherwise set, propulsion system 308 may prevent vehicle 101 from driving or, more generally, travelling.

Navigation system 312 may control propulsion system 308 to navigate autonomous vehicle 101 through paths and/or within unstructured open or closed environments. Navigation system 312 may include at least one of digital maps, street view photographs, and a global positioning system (GPS) point. Maps, for example, may be utilized in cooperation with sensors included in sensor system 324 to allow navigation system 312 to cause autonomous vehicle 101 to navigate through an environment.

Sensor system 324 includes any sensors, as for example LiDAR, radar, ultrasonic sensors, microphones, altimeters, and/or cameras. Sensor system 324 generally includes onboard sensors which allow autonomous vehicle 101 to safely navigate, and to ascertain when there are objects near autonomous vehicle 101. In one embodiment, sensor system 324 may include propulsion systems sensors that monitor drive mechanism performance, drive train performance, and/or power system levels. Data collected by sensor system 324 may be used by a perception system associated with navigation system 312 to determine or to otherwise understand an environment around autonomous vehicle 101.

Light system 328 is configured to provide lighting and/or illumination with respect to autonomous vehicle 101. Light system 328 may generally be arranged to provide light externally with respect to autonomous vehicle 101 using one or more headlights or headlamps 328a controlled by a headlight or headlamp controller 328b. Light system 328 may also provide light substantially internally with respect to autonomous vehicle 101, e.g., by providing light within a compartment such as compartment 102 of FIG. 2. Light system 328 will be discussed in more detail below with respect to FIG. 5. It should be appreciated that light system 328 typically also includes taillights (not shown) that may also be controlled by headlight controller 328b.

Power system 332 is arranged to provide power to autonomous vehicle 101. Power may be provided as electrical power, gas power, or any other suitable power, e.g., solar power or battery power. In one embodiment, power system 332 may include a main power source, and an auxiliary power source that may serve to power various components of autonomous vehicle 101 and/or to generally provide power to autonomous vehicle 101 when the main power source does not have the capacity to provide sufficient power. In one embodiment, power system 332 includes a battery which is arranged to maintain a charge level and may be charged.

Communications system 340 allows autonomous vehicle 101 to communicate, as for example, wirelessly, with a fleet management system (not shown) that allows autonomous vehicle 101 to be controlled remotely. Communications system 340 generally obtains or receives data, stores the data, and transmits or provides the data to a fleet management system and/or to autonomous vehicles 101 within a fleet 100. The data may include, but is not limited to including, information relating to scheduled requests or orders, information relating to on-demand requests or orders, and/or information relating to a need for autonomous vehicle 101 to reposition itself, e.g., in response to an anticipated demand.

In some embodiments, control system 336 may cooperate with processor 304 to determine where autonomous vehicle 101 may safely travel, and to determine the presence of objects in a vicinity around autonomous vehicle 101 based on data, e.g., results, from sensor system 324. In other words, control system 336 may cooperate with processor 304 to effectively determine what autonomous vehicle 101 may do within its immediate surroundings. Control system 336 in cooperation with processor 304 may essentially control power system 332 and navigation system 312 as part of driving or conveying autonomous vehicle 101. Additionally, control system 336 may cooperate with processor 304 and communications system 340 to provide data to or obtain data from other autonomous vehicles 101, a management server, a global positioning server (GPS), a personal computer, a teleoperations system, a smartphone, or any computing device via the communication module 340. In general, control system 336 may cooperate at least with processor 304, propulsion system 308, navigation system 312, sensor system 324, and power system 332 to allow vehicle 101 to operate autonomously. That is, autonomous vehicle 101 is able to operate autonomously through the use of an autonomy system that effectively includes, at least in part, functionality provided by propulsion system 308, navigation system 312, sensor system 324, power system 332, and control system 336. Components of propulsion system 308, navigation system 312, sensor system 324, power system 332, and control system 336 may effectively form a perception system that may create a model of the environment around autonomous vehicle 101 to facilitate autonomous or semi-autonomous driving.

As will be appreciated by those skilled in the art, when autonomous vehicle 101 operates autonomously, vehicle 101 may generally operate, e.g., drive, under the control of an autonomy system. That is, when autonomous vehicle 101 is in an autonomous mode, autonomous vehicle 101 is able to generally operate without a driver or a remote operator controlling autonomous vehicle. In one embodiment, autonomous vehicle 101 may operate in a semi-autonomous mode or a fully autonomous mode. When autonomous vehicle 101 operates in a semi-autonomous mode, autonomous vehicle 101 may operate autonomously at times and may operate under the control of a driver or a remote operator at other times. When autonomous vehicle 101 operates in a fully autonomous mode, autonomous vehicle 101 typically operates substantially only under the control of an autonomy system. The ability of an autonomous system to collect information and extract relevant knowledge from the environment provides autonomous vehicle 101 with perception capabilities. For example, data or information obtained from sensor system 324 may be processed such that the environment around autonomous vehicle 101 may effectively be perceived.

As previously mentioned, headlights 328a of light system 328 may generally provide light that is effectively external to autonomous vehicle 101. By way of example, headlights 328a may shine light in front of autonomous vehicle 101 as autonomous vehicle 101 travels. In one embodiment, headlights 328a may be used as daytime running lights and/or lights which provide illumination as autonomous vehicle 101 travels in the dark, as well as to communicate and/or to otherwise convey information. It should be appreciated that each headlight or headlamp 328a may include separate lighting arrangements such as a daytime running light arrangement and a low/high beam light arrangement. That is, headlight 328a may include separate light arrangements that serve separate purposes, as will be described below with respect to FIGS. 11 and 12.

Figure 4:
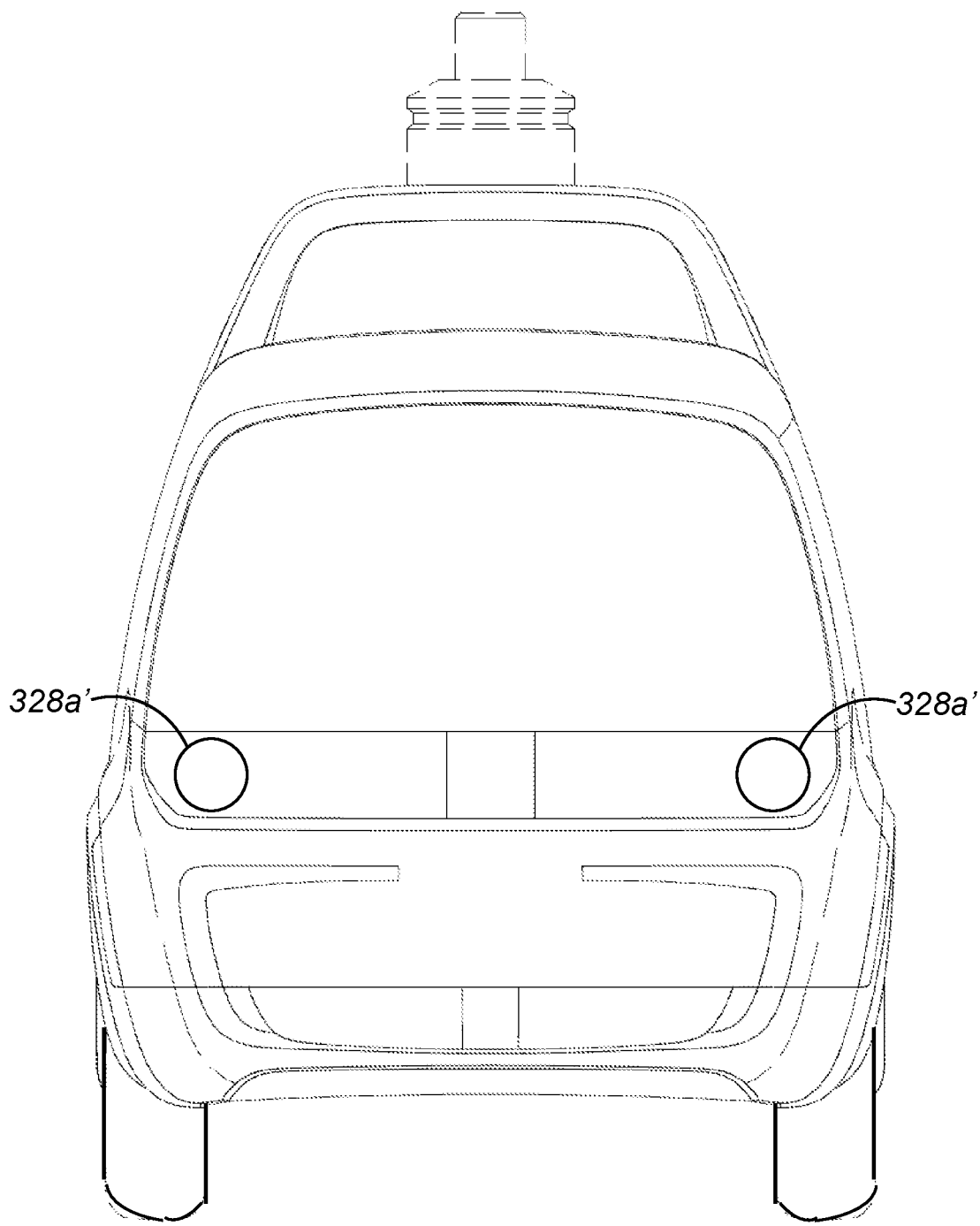
FIG. 4 is a diagrammatic representation of a front of an autonomous vehicle that includes headlights in accordance with an embodiment.

FIG. 4 is a diagrammatic representation of a front of an autonomous vehicle that includes headlights in accordance with an embodiment. Autonomous vehicle 101' includes headlights 328a' on a front side that are generally arranged to provide light that provides illumination in front of vehicle 101' and/or that visually communicates information. Headlights 328a' may be arranged to visually communicate information when, for example, headlights 328a' are not being used as daytime running lights and/or lights which provide illumination while vehicle 101' travels in the dark. In one embodiment, when vehicle 101' is not travelling, e.g., operating to drive to a destination or otherwise navigating from a start point to an end point, headlights 328a' may be used to convey information substantially to anyone, or anything, with a view of headlights 328a'. The information conveyed may vary widely, and may include, but is not limited to including, information which indicates that vehicle 101' is awaiting an action from a user, information which indicates that vehicle 101' is being charged, and/or information which indicates that vehicle 101' is ready to depart or begin to travel. The communication of information may include, but is not limited to including, varying the intensity of light emitted from headlights 328a' by dimming and/or brightening the light.

Figure 5:
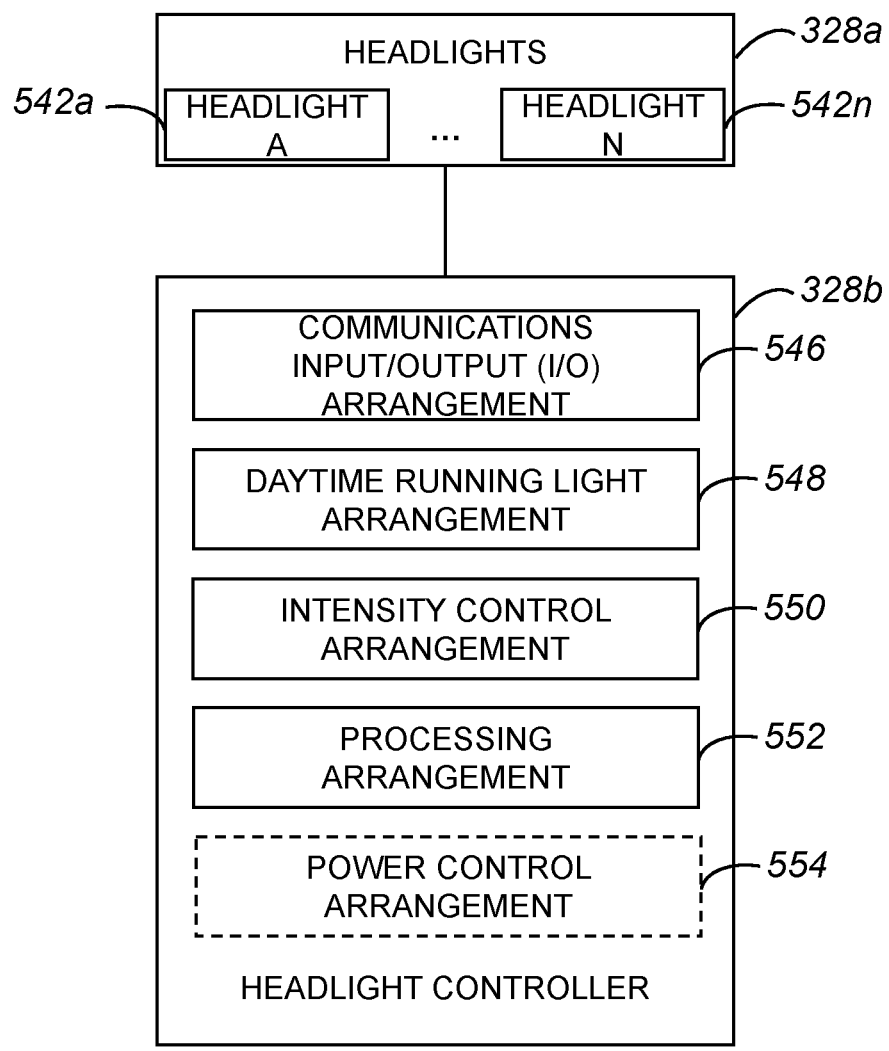
FIG. 5 is a block diagram representation of a light system, e.g., light system 328 of FIG. 3, in accordance with an embodiment.

With reference to FIG. 5, light system 328 of FIG. 3 will be discussed in accordance with an embodiment. Light system 328 generally includes headlights 328a and headlight controller 328b. Headlights 328a may include one or more headlight units or headlamps 542a-n. Headlight units 542a-n may be, in one embodiment, light emitting diode (LED) lights. It should be appreciated, however, that headlight units 542a-n may be any suitable type of light unit or fixture, and are not limited to being LEDs. As will be discussed below with respect to FIG. 9, when headlight units 542a-n are LEDs, each headlight unit 542a-n may include multiple LEDs.

Headlight controller 328b may generally include hardware and/or software logic configured to substantially control headlights 328a. Headlight controller 328b may includes a communications input/output (I/O) arrangement 546, a daytime running light arrangement 548, an intensity control arrangement 550, a processing arrangement 552, and an optional power control arrangement 554. It should be appreciated that, in one embodiment, headlight controller 328b may effectively include separate arrangements such as separate daytime running light arrangements 438 and intensity control arrangements 550, for each headlight 328a. That is, headlight controller 328b may be configured to control each headlight 328a substantially independently.

Communications I/O arrangement 546 enables headlight controller 328b to communicate with headlights 328a as well as with other systems associated with vehicle 101 of FIG. 3. Communications I/O arrangement 546 may support both wired and wireless communications.

Daytime running light arrangement 548 is configured to enable headlights 328a to turn on and remain on substantially while vehicle 101 of FIG. 3 is effectively powered on, operating, and/or in gear. In one embodiment, daytime running light arrangement 548 may be configured to substantially automatically turn on or switch on headlights 328a to emit light when vehicle 101 of FIG. 3 when vehicle 101 is in moving or braked while effectively in gear. As will be appreciated by those skilled in the art, daytime running light arrangement 548 may be turned on when ambient light is bright and/or when environmental conditions are relatively clear, as for example when there is no precipitation, e.g., no rain.

Intensity control arrangement 550 is configured to control the intensity of light emitted by headlights 328a. In one embodiment, intensity control arrangement 550 may be arranged to dim and/or to brighten light emitted by headlights 328a based on instructions provided by processing arrangement 552. By way of example, intensity control arrangement 550 may substantially cause headlights 328a to transition or substantially oscillate linearly or sinusoidally between first and second intensity levels to effectively simulate a breathing effect for headlights 328a. That is, intensity control arrangement 550 may substantially cause the intensity of light emitted by headlights 328a to vary back-and-forth, or to substantially alternate or transition, between a first intensity level and a second intensity level. Intensity control arrangement 550 may also cause headlights 328a to essentially flash by causing headlights 328a to operate in a repetitive binary pattern such that such that headlights are either off or on, e.g., either not emitting light or emitting light at a predetermined intensity level. The intensities may vary between approximately zero candela and approximately 3000 candela. In one embodiment, a first intensity level may be approximately 500 candela and a second intensity level may be approximately 3000 candela.

Processing arrangement 552 may be arranged to cooperate with daytime running light arrangement 548 and intensity control arrangement 550 to control headlights 328a. For example, processing arrangement 552 may obtain information or instructions from other systems on vehicle 101 of FIG. 3 through communications I/O arrangement 546 and cause daytime running light arrangement 548 to either turn on or off, and cause intensity control arrangement 550 to specify or control the intensity of light emitted by headlights 328a.

Optional power control arrangement 554 may be arranged to cooperate with intensity control arrangement 550 to substantially alter an amount of power provided to headlights 328a such that the intensity of light emitted by headlights 328a may be varied. It should be appreciated that intensity control arrangement 550 may be configured to control the intensity of light emitted by headlights 328a substantially without the cooperation of optional power control arrangement 554.

Figure 6:
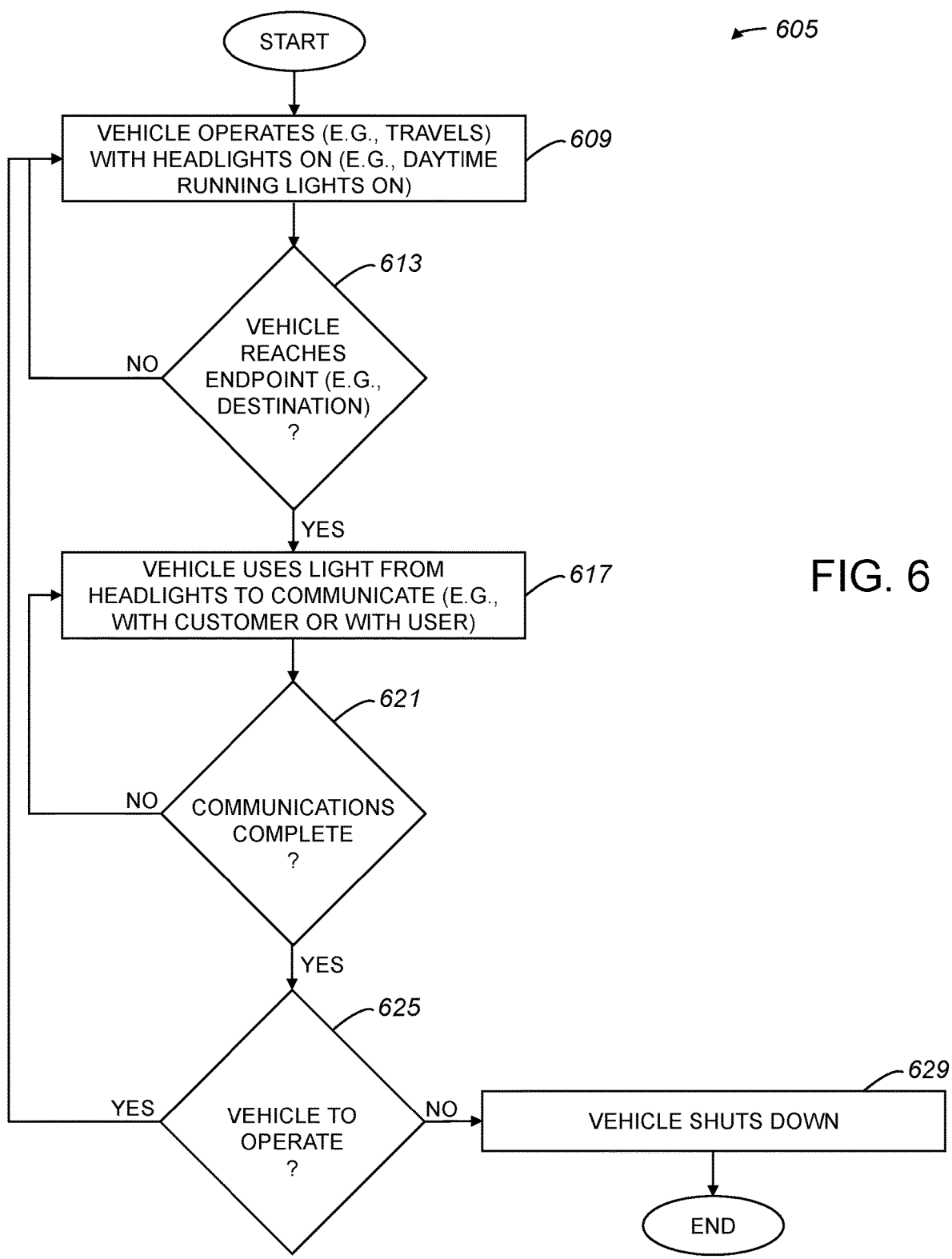
FIG. 6 is a process flow diagram which illustrates a method of operating a vehicle which includes headlights configured to communicate information in accordance with an embodiment.

In one embodiment, headlights such as headlights 328a may be configured to operate as daytime running lights and/or operate to provide light in darkness when vehicle 101 of FIG. 3 is operating or in gear, and configured to essentially convey information at other times. FIG. 6 is a process flow diagram which illustrates a method of operating a vehicle which includes headlights configured to communicate information in accordance with an embodiment. The information may generally be associated with a current status of the vehicle, e.g., whether the vehicle is awaiting a customer interaction or whether the vehicle is in need of charging. A method 605 of operating a vehicle which includes headlights configured to communicate information begins at a step 609 in which a vehicle, e.g., an autonomous vehicle, operates or travels with headlights on. For example, the vehicle may operate with daytime running lights on to enable road users to more readily see the vehicle, or the vehicle may operate with low or high beam lights if appropriate.

In a step 613, it is determined whether the vehicle has reached an endpoint, e.g., destination. That is, it is determined whether the vehicle has reached a location, as for example a customer location or a vehicle maintenance location, at which the vehicle is intended to stop.

If the determination is that the vehicle has not reached an endpoint, then process flow returns to step 609 in which the vehicle continues to operate. Alternatively, if the determination is that the vehicle has reached an endpoint, then in a step 617, the vehicle uses light emitted by the headlights to communicate, as for example with a customer or a user. It should be appreciated that when the vehicle has reached the endpoint, the vehicle may generally be taken out of gear. In general, the headlights may be configured to use particular light patterns and/or intensities to convey information to a customer or a user. The vehicle may be configured to communicate with headlights when the vehicle is taken out of gear. Methods of using headlights to communicate will be described below with respect to FIGS. 6 and 7.

A determination is made in a step 621 as to whether communications using light from headlights have been completed. If it is determined that the communications have not been completed, process flow returns to step 617 in which the vehicle continues to use light from the headlights to communicate. On the other hand, if the determination is that communications have been completed, then in a step 625, it is determined whether the vehicle is to begin to operate again. In other words, a determination is made as to whether the vehicle is to travel to another destination.

If it is determined in step 625 that the vehicle is to operate again, the implication is that the vehicle is to travel to a new destination. The vehicle travelling to a new destination may generally involve the vehicle being put into gear to enable the vehicle to travel. As such, process flow returns to step 609 in which the vehicle operates. Alternatively, if the determination is that the vehicle is not to operate, the vehicle may be shut down in a step 629, and the method of operating a vehicle which includes headlights configured to communicate information is completed.

Figure 7:
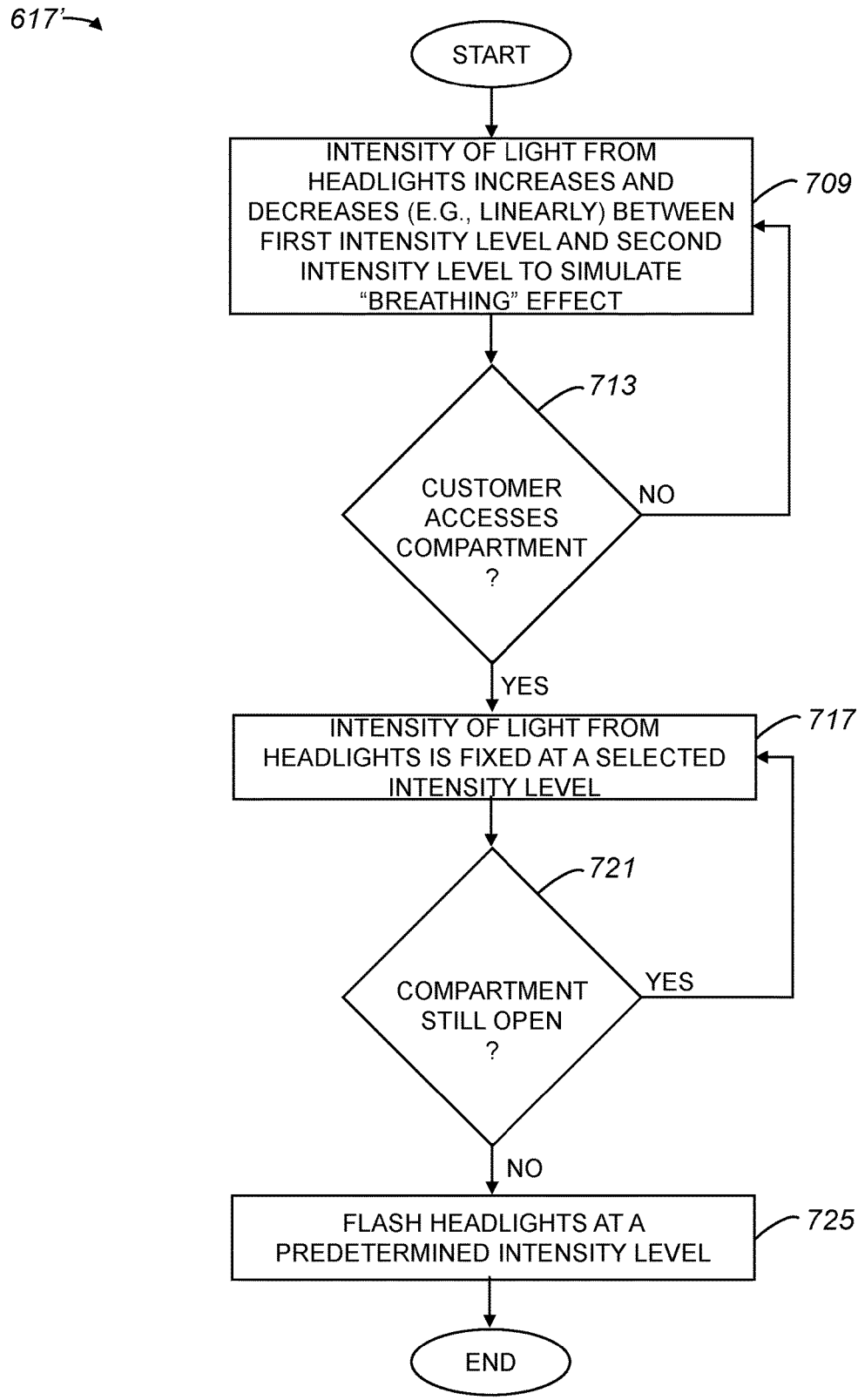
FIG. 7 is a process flow diagram which illustrates a first method of using light from headlights to communicate, e.g., step 617 of FIG. 6, in accordance with an embodiment.

Referring next to FIG. 7, a first method of a vehicle using light from headlights to communicate, e.g., step 617 of FIG. 6, will be described in accordance with an embodiment. In one embodiment, lights from headlights may vary between a relatively low intensity and a relatively high intensity to substantially create a "breathing" effect. That is, light emitted from headlights may have in intensity that varies back-and-forth between a first level and a second level to enable the headlights to effectively simulate a breathing effect or motion. The breathing of the vehicle may provide a user, e.g., a customer or recipient of a delivery carried on the vehicle, with a sense or impression that the vehicle is patiently awaiting an action by the user. A positive customer experience may be provided by the breathing effect or motion, as a customer may view the vehicle as friendly, interactive, and somewhat human-like.

A first method 617' of using light from headlights of a vehicle to communicate that the vehicle is effectively breathing begins at a step 709 in which the intensity of light emitted from one or more headlights of the vehicle increases and decreases between a first intensity level and a second intensity level to create a breathing effect. The first intensity level may be a relatively low intensity level, e.g., an approximately zero intensity, while the second intensity level may be a relatively high intensity level, e.g., an approximately maximum level of intensity that may be provided by the one or more headlights. The intensity of light emitted by or emanating from the one or more headlights may vary between intensity levels in any suitable manner, e.g., linearly and/or sinusoidally. The variation may be substantially cyclic in that the intensity may increase from the first intensity level to the second intensity level, decrease from the second intensity level to the first intensity level, increase again from the first intensity level to the second intensity level, etc.

In one embodiment, the vehicle continues to simulate a breathing effect until a customer takes an action with respect to the vehicle. A determination is made in a step 713 as to whether a customer has accessed a compartment of the vehicle. Such a determination may include, but is not limited to including, ascertaining whether a compartment is open or opening, ascertaining whether the customer has been authenticated, and/or ascertaining whether the customer has been provided with an ability to open a compartment, If it is determined that the customer has not accessed a compartment of the vehicle, the vehicle intensity of light emitted by the one or more headlights continues to increase and decrease to simulate a breathing effect.

Alternatively, if it is determined in step 713 that the customer has accessed the compartment, then the vehicle may cease simulating the breathing effect, and in a step 717, the intensity of light emitted by the headlights may be fixed at a selected intensity level. In one embodiment, the headlights may effectively be turned off, e.g., the light may have an intensity level of approximately zero. While the customer interacts with the compartment, as for example to remove goods from and/or to load goods into the compartment, the light from the headlights may remain fixed at the selected intensity level.

A determination is made in a step 721 as to whether the compartment accessed by the customer is still open. In other words, it is determined whether the customer is still interacting with the compartment. If it is determined that the customer is still interacting with the compartment, the process flow returns to step 171 in which the intensity of the light emitted by the one or more headlights continues to be at a fixed intensity level.

Alternatively, if the determination in step 721 is that the compartment is no longer open, the implication is that the customer has completed his or her interaction with the compartment. Accordingly, in a step 725, the vehicle effectively signals using the one or more headlights that the vehicle is about to depart, In the described embodiment, the one or more headlights may flash with a predetermined level of intensity to effectively signal that the vehicle is ready to depart. Once the vehicle effectively signals that it is prepared to depart, the first method of using lights from headlights of a vehicle to communicate is completed.

One or more headlights of a vehicle may be used to convey information relating to how much electrical charge is currently in the vehicle or, more generally, the current fuel or power level in the vehicle. For example, while an electric vehicle is charging, one or more headlights may emit light at an intensity which is configured to correlate with a current charge level of the electric vehicle such that as the charge level increases, the intensity of the emitted light increases. In one embodiment, one headlight on a vehicle may be configured to effectively communicate that a charging process is ongoing, and another headlight on the vehicle may be configured to effectively communicate a current charge level of the vehicle.

Figure 8:
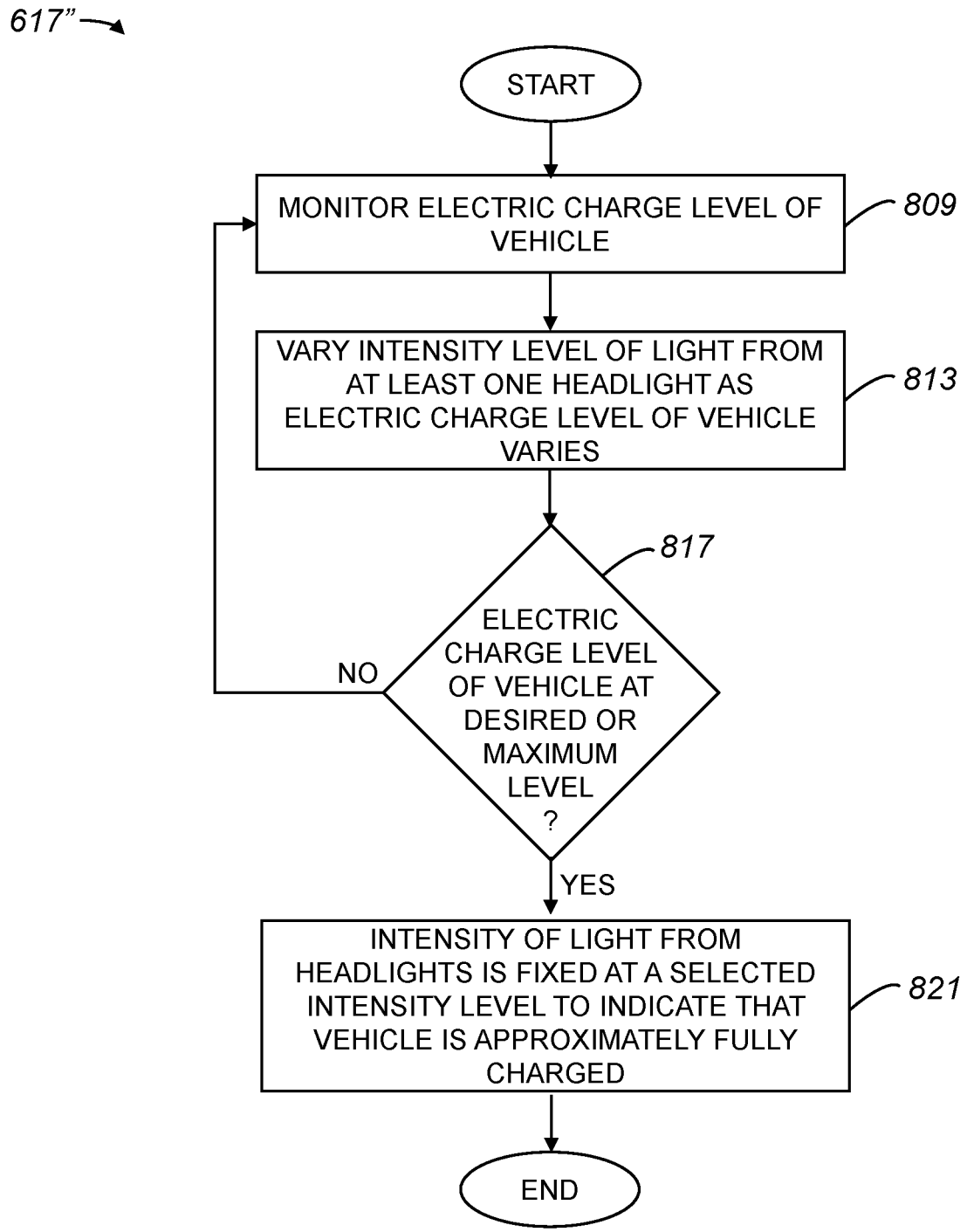
FIG. 8 is a process flow diagram which illustrates a second method of using light from headlights to communicate, e.g., step 617 of FIG. 6, in accordance with an embodiment.

FIG. 8 is a process flow diagram which illustrates a second method of using light from headlights to communicate, e.g., step 617 of FIG. 6, that involves correlating a charge level of a vehicle with the intensity level of light emitted from the headlights in accordance with an embodiment. A second method 617" of using light from headlights to communicate begins at a step 809 in which, while a vehicle is being charged, the electric charge level of the vehicle is monitored. Monitoring the electric charge level of the vehicle may be performed using data available on the vehicle, and/or using data available from an electric charge station.

In a step 813, the intensity level of the light emitted from at least one headlight of the vehicle is varied as the monitored electric charge level varies. For example, the intensity of the light emitted may be approximately zero if the current charge level of the vehicle is approximately empty or zero, and the intensity of light emitted may be at a substantially maximum intensity level when the current charge level of the vehicle is at a desired or approximately maximum level.

From step 813, process flow proceeds to a step 817 in which it is determine whether the vehicle is substantially fully charged. That is, it is determined whether the vehicle is charged to a desired level or a substantially maximum level. If it is determined that the vehicle is not charged to a desired level or a substantially maximum level, then process flow returns to step 809 in which the electric charge level of the vehicle continues to be monitored.

Alternatively, if it is determined that the electric charge level of the vehicle is at a desired or maximum level, then, in a step 821, the headlights may communicate that the vehicle is approximately fully charged. In one embodiment, the intensity of light emitted from the headlights may be substantially fixed at a selected intensity level to indicate that the vehicle is approximately fully charged. Once the intensity of light is fixed to indicate that the vehicle is approximately fully charged, or charged to a desired level, the method of using light from headlights to communicate is completed.

In one embodiment, rather than a headlight indicating an amount of charge in a vehicle while the vehicle is charging, the headlight may simulate a breathing effect while the vehicle is being charged. That is, a breathing effect implemented by lights on a vehicle while the vehicle is charging may indicate to a user that the vehicle is currently charging. Further, the breathing effect may be such that a high value of intensity associated with the breathing effect may correlate with the level of electric charge currently available in the vehicle. As such, the high value associated with the breathing effect may vary as the vehicle collects electric charge.

Figure 9:
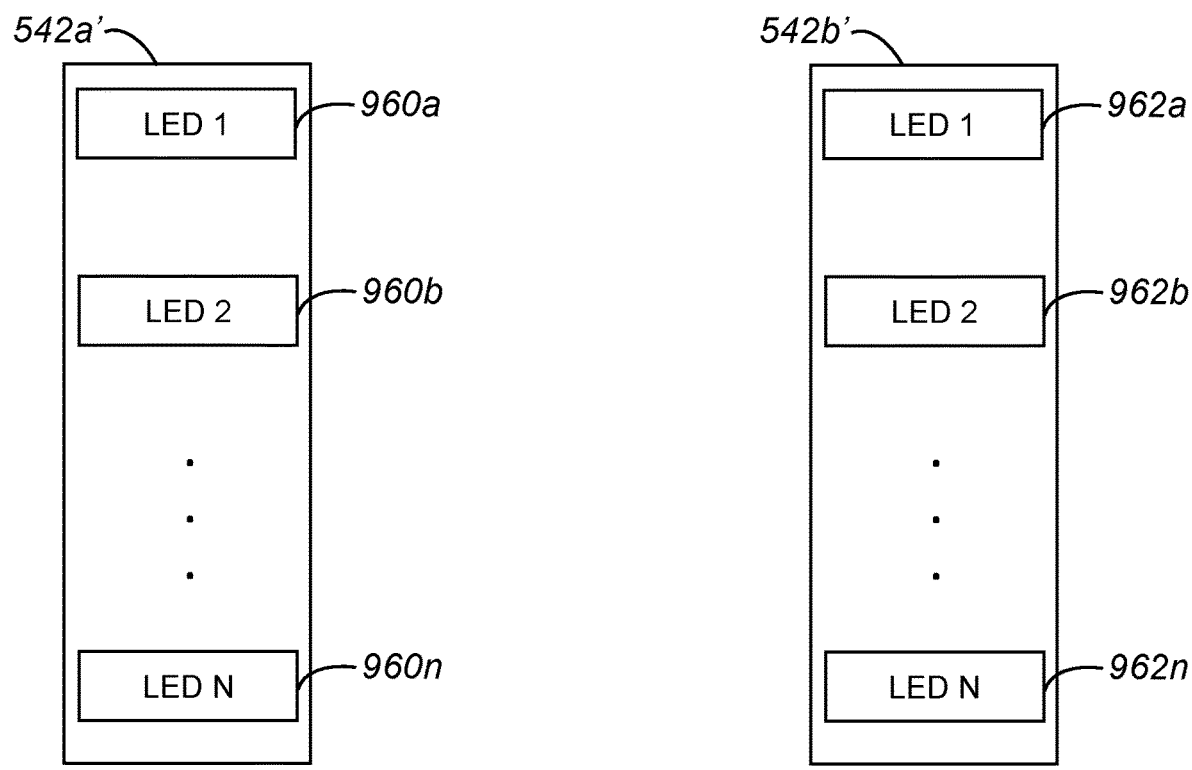
FIG. 9 is a block diagram representation of headlights, e.g., headlights 542a and 542b of FIG. 5, in accordance with an embodiment.

As previously mentioned, each headlight unit, e.g., headlight unit 542a and/or headlight unit 542b of FIG. 5, may be formed from multiple LEDs. FIG. 9 is a block diagram representation of headlights, e.g., headlights 542a and 542b of FIG. 5, in accordance with an embodiment. Headlights 542a' may be formed from one or more LEDs 960a-n, and headlight 542b' may be formed from one or more LEDs 962a-n. LEDs 960a-n may be controlled, as for example by headlight controller 328b of FIG. 3, such that substantially all LEDs 960a-n have the same intensity, and LEDs 962a-n may be controlled by headlight controller 328b such that substantially all LEDs 962a-n have the same intensity.

In lieu of substantially all LEDs 960a-n being controlled together and substantially all LEDs 962a-n being controlled together, LEDs 960a-n may instead each be controlled individually, and LEDs 962a-n may also each be controlled individually. By controlling each LED 960a-n and each LED 962a-n substantially individually, information conveyed using headlights 542a', 542b' may be further enhanced. For example, intensities, colors, and patterns of light emitted by individual LEDs 960a-n and/or LEDs 962a-n may be selected to convey particular information.

Figure 10:
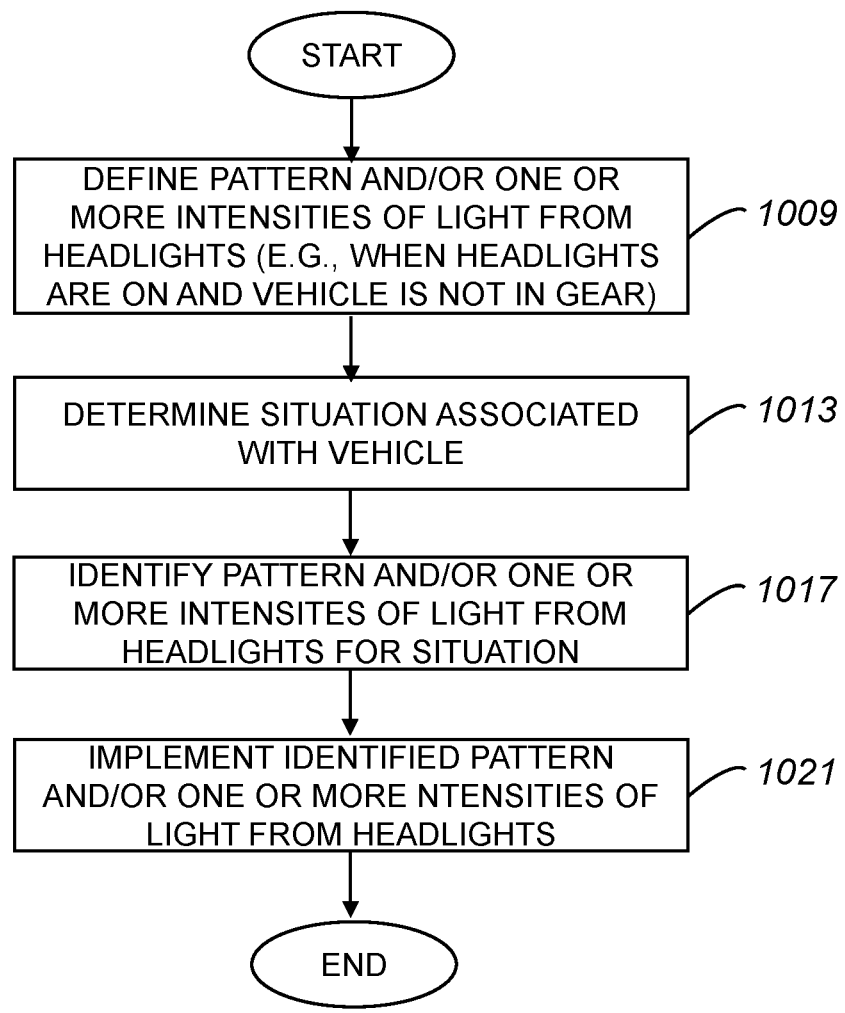
FIG. 10 is a process flow diagram which illustrates a method of utilizing headlights to communicate situation-specific information in accordance with an embodiment.

The information conveyed by different intensities and/or patterns associated with headlights may be selected by an enterprise, as for example by an owner or a user of a vehicle. Specific intensities and/or patterns may be substantially defined to signify a particular message. FIG. 10 is a process flow diagram which illustrates a method of utilizing headlights of a vehicle to communicate situation-specific information in accordance with an embodiment. A method 1005 of utilizing headlights of a vehicle to communicate situation-specific information begins at a step 1009 in which a pattern and/or one or more intensities of light emitted from headlights is defined. The pattern and/or one or more intensities may be defined to indicate situations including, but not limited to including, the vehicle awaiting a customer action, a status of the vehicle with respect to a charging process, the vehicle being placed into gear and being ready to begin travelling, the vehicle being available for use, the vehicle having an issue, and/or the vehicle being out-of-service. The defined pattern and/or one or more intensities may be defined to be substantially implemented, for example, when headlights are on and the vehicle is not in gear. In one embodiment, the defined pattern may include the use of daytime running lights, position lights, turn signal lights, low beam lights, and/or high beam lights.

In a step 1013, a situation associated with the vehicle is determined or otherwise identified. The situation may be determined by the vehicle using sensors associated with the vehicle and/or communications obtained by the vehicle, e.g., communications from a fleet management system. Then, in a step 1017, the pattern and/or one or more intensities of light which are defined for the situation are identified. That is, a pattern and/or intensity of light which is indicative of the situation is identified. Once the pattern and/or one or more intensities of light are identified, the pattern and/or one or more intensities of light are effectively implemented with respect to a headlight system in a step 1021. Upon implementing the pattern and/or one or more intensities of light identified for the situation associated with the vehicle, the method of utilizing headlights of a vehicle to communicate situation-specific information is completed.

Figure 11:
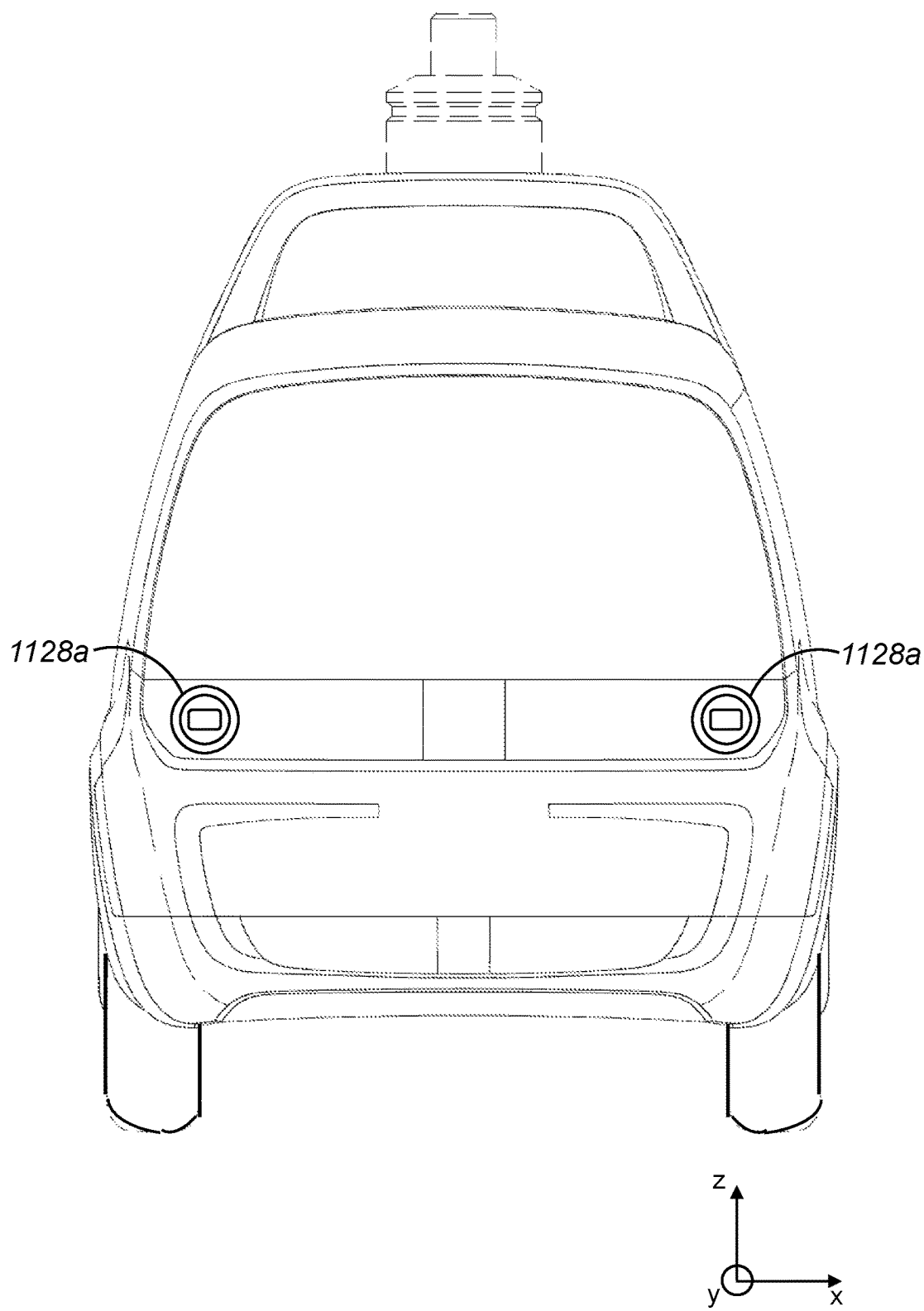
FIG. 11 is a diagrammatic representation of a front of an autonomous vehicle with headlights that include more than one lighting arrangement in accordance with an embodiment.
Figure 12:
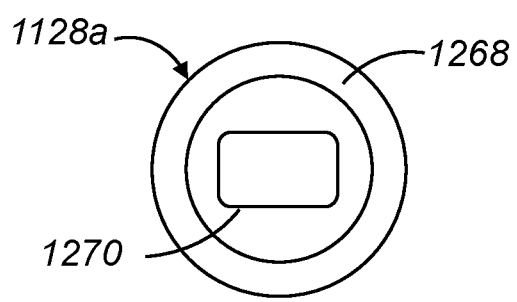
FIG. 12 is a diagrammatic representation of one configuration for a headlight, e.g., headlight 1128a of FIG. 11, in accordance with an embodiment.
Figure 12:
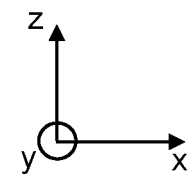

With reference to FIGS. 11 and 12, one configuration of headlights or optical assemblies which may be used to communicate with an observer will be described in accordance with an embodiment. For example, a headlight may include two headlight arrangements such as a daytime running light arrangement and a low/high beam light arrangement. FIG. 11 is a diagrammatic representation of a front of an autonomous vehicle that includes headlights which each include more than one headlight arrangement in accordance with an embodiment. Autonomous vehicle 1101 includes headlights or optical assemblies 1128a on a front side that are generally arranged to provide light that provides illumination in front of vehicle 1101 and/or that visually communicates information to an observer. Headlights 1128a, which may include two or more headlight arrangements, may be arranged to visually communicate information when, for example, headlights 1128a are not in use as daytime running lights and/or lights which provide illumination while vehicle 1101 travels in the dark. In one embodiment, when vehicle 1101 is parked, e.g., not operating to drive to a destination or otherwise navigating from a start point to an end point, headlights 1128a may be used to convey information substantially to anyone, or anything, with a view of headlights 1128a. The information conveyed may vary widely, and may include, but is not limited to including, information which indicates that vehicle 1101 is awaiting an action from a user, information which indicates that vehicle 1101 is being charged, and/or information which indicates that vehicle 1101 has completed a mission and is ready to depart or begin to travel. The communication of information may include, but is not limited to including, varying the intensity of light emitted from headlights 1128a by dimming and/or brightening the light.

With reference to FIG. 12, headlight 1128a of FIG. 11 will be discussed in accordance with an embodiment. Headlight 1128a includes a first headlamp arrangement 1268 and a second headlamp arrangement 1270. In one embodiment, first headlamp arrangement 1268 is effectively arranged as a ring of light around a perimeter of headlight 1128a, and second headlamp arrangement 1270 is arranged as a block of light arranged around a center of headlight 1128a.

First headlamp arrangement 1268 is configured for use as a daytime running light, a turn signal, and a front position light. It should be appreciated that when first headlamp arrangement 1268 is used as a daytime running light, first headlamp arrangement 1268 may sustain a particular level of brightness. However, while first headlamp arrangement 1268 is used as a turn signal, first headlamp arrangement 1268 may effectively flash such that the level of brightness varies.

Second headlamp arrangement 1270 configured as a light which may be a low beam or a high beam. That is, second headlamp arrangement 1270 is configured to provide low beam lights or high beam lights while vehicle 1101 of FIG. 11 is operating. As will be appreciated by those skilled in the art, high beam lights may be brighter and be characterized by a substantially symmetrical beam that illuminates a longer distance, while low beam lights may be less bright and characterized by a substantially asymmetrical beam that illuminates a shorter distance than the high beam lights.

The use of arrangements 1268, 1270 to convey information to an observer, e.g., a user, may vary. For example, first headlamp arrangement 1268 may be used as a daytime running light while in operation when there is no rain and/or there is a relatively bright ambient light, and may substantially oscillate between a lower intensity and a higher intensity to simulate "breathing" while awaiting a customer while there is effectively no rain and/or ambient light intensity is relatively good, as for example in daylight on a clear day. First headlamp arrangement 1268 may also blink one or more times when a human machine interface associated with vehicle 1101 of FIG. 11 receives an input from the customer while there is substantially no rain and/or light intensity is relatively good. In one embodiment, while vehicle 1101 of FIG. 11 is charged, first headlamp arrangement may turn on and remain on at a predetermined level of brightness or intensity.

First headlamp arrangement 1268 may be used as a position light while in operation when environmental conditions include rain and/or there is relatively low ambient light, and may oscillate between a lower intensity and a higher intensity while awaiting a customer while there is rain and/or an ambient light intensity is relatively low, as for example at dawn or dusk. First headlamp arrangement 1268, effectively used as a position light, may also perform a breathing effect or blink when a human machine interface associated with vehicle 1101 of FIG. 11 receives an input from the customer while there is rain and/or light intensity is relatively low.

A turn signal functionality associated with first headlamp arrangement 1268 may generally blink to indicate a turn direction while vehicle 1101 of FIG. 11 is operating. For example, when headlight 1128 is a right headlight or a headlight on a right-hand side of vehicle 1101 of FIG. 11, while the vehicle is in operation, turn signal functionality may cause first headlamp arrangement 1268 to blink one or more times to embody a right turn indication. Turn signal functionality may be such that a particular number of blinks and a particular color of light associated with first headlamp arrangement 1268, while vehicle 1101 of FIG. 11 is in a park gear, i.e., when a park gear is engaged, may indicate a vehicle charging error, and a double blink with a relatively long pause, e.g., a pause of approximately 2000 milliseconds, while vehicle 1101 is in a park, may indicate a need for a charge.

Figure 13:
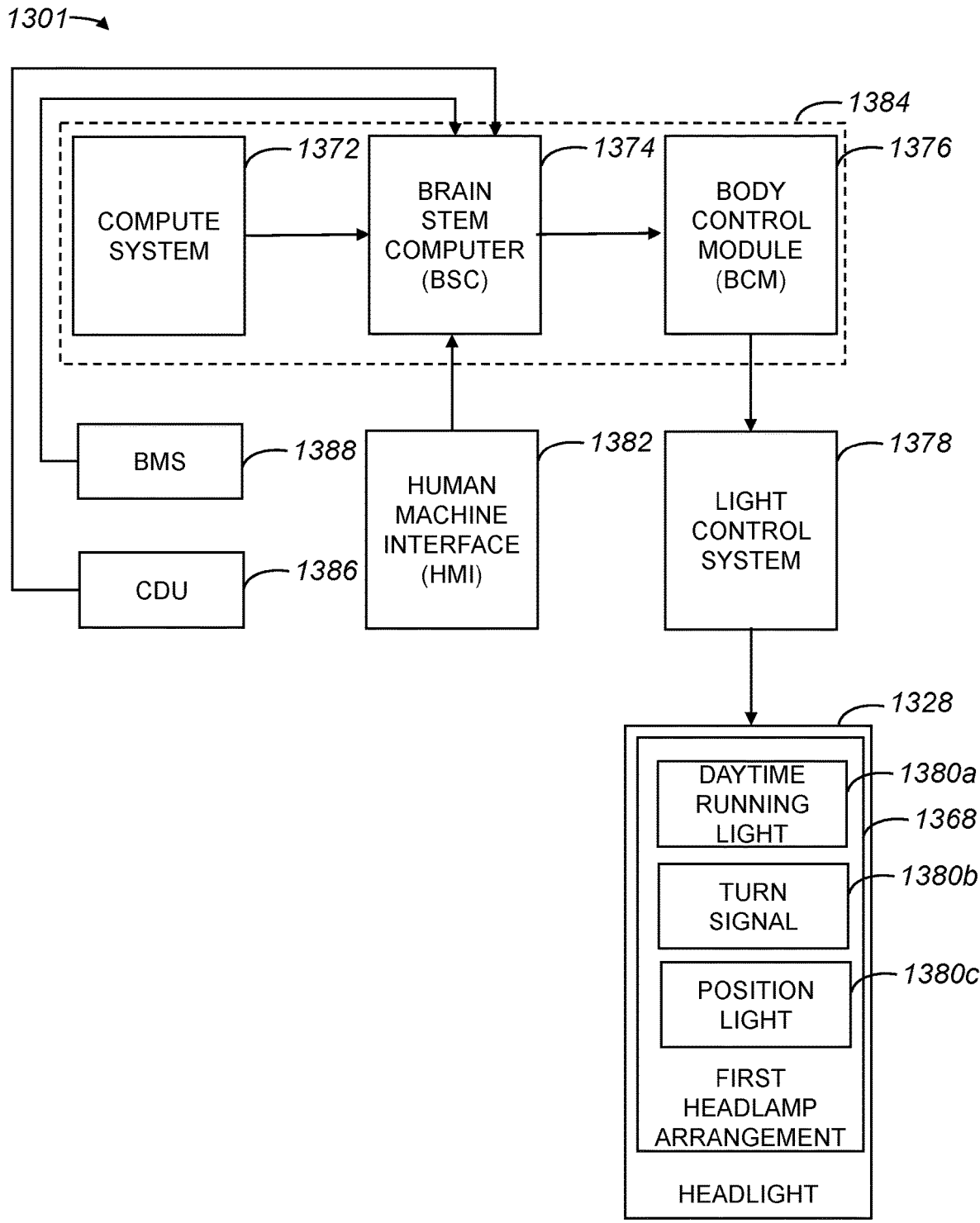
FIG. 13 is a block diagram representation of a flow of signals associated with headlights in accordance with an embodiment.
Figure 14:
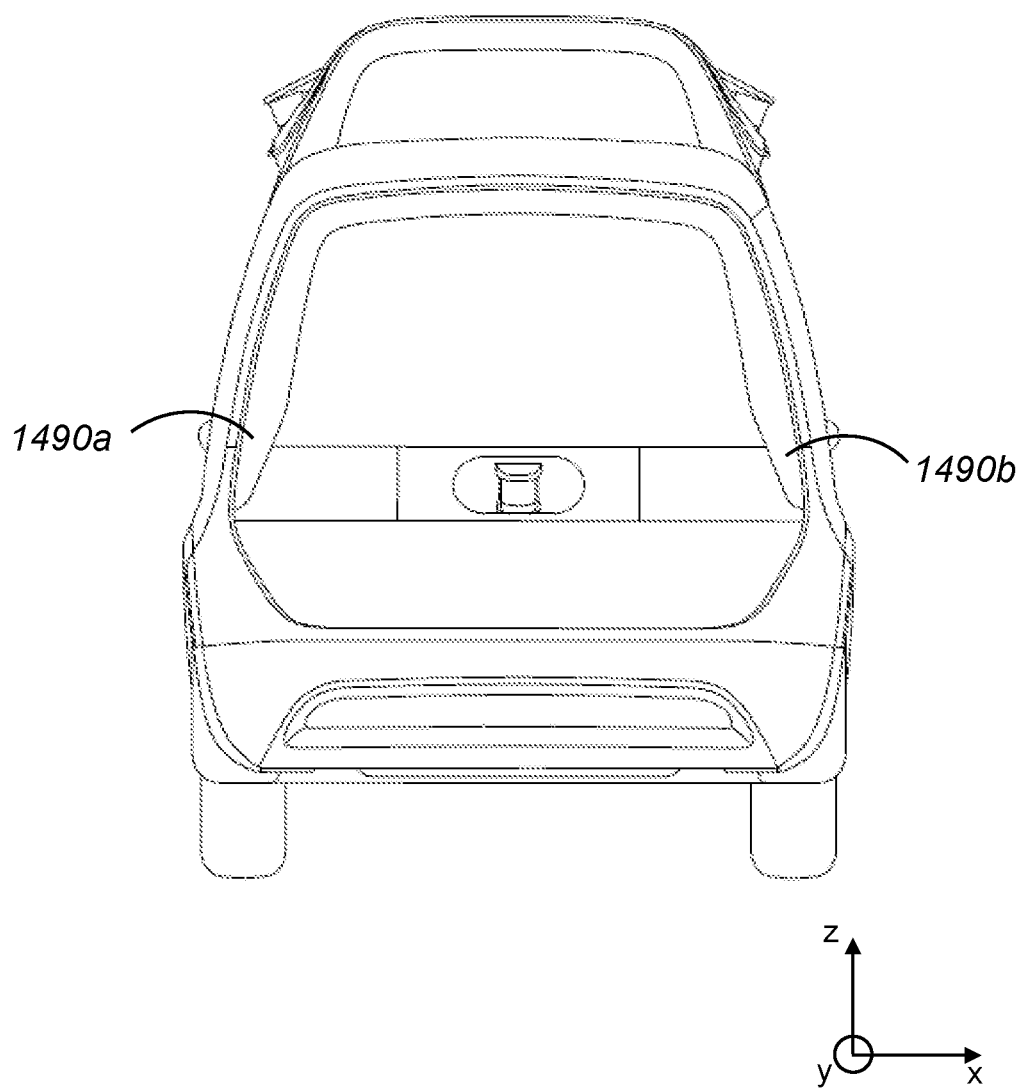
FIG. 14 is a diagrammatic representation of a back of an autonomous vehicle with taillights or rear lights that may be used to communicate in accordance with an embodiment.

Within a vehicle, signals may be obtained, processed, and provided by various systems to facilitate the use of headlights to communicate with an observer. FIG. 13 is a block diagram representation of a flow of signals associated with a headlight in a vehicle in accordance with an embodiment. A vehicle 1301 which is configured to operate autonomously may to communicate using at least one headlight 1328 or, more generally, an optical assembly. It should be appreciated that while one headlight 1328 is shown, vehicle 1301 may typically include more than one headlight 1328.

Vehicle 1301 includes a compute system 1372 configured to cooperate with a brain stem computer (BSC) 1374 to facilitate the operation of vehicle 1301. Compute system 1372 may obtain information such as a rain light sensor (RLS) status and provide information relating to the location of vehicle 1301, as for example GPS information, to BSC 1374. The information may be provided on an Ethernet connection. In one embodiment, compute system 1372, BSC 1374, and BCM 1376 effectively form an overall computing system 1384 disposed on vehicle 1301.

BSC 1374 also obtains information from a battery management system (BMS) 1388, information from a charging and distribution unit (CDU) 1386, and information from a human machine interface (HMI) 1382. BMS 1388 provides a low voltage warning to BSC 1374 when a battery or charge level of vehicle 1301 falls below a particular threshold, and CDU 1386 provides a charge system status and a charge fault status to BSC 1374. BMS 1388 and CDU 1386 may communicate with BSC 1374 on a bus, e.g., a control area network (CAN) bus. HMI 1382 is configured to effectively interact with a user, e.g., a customer who inputs information into HMI 1382, and to provide an interaction status to BSC 1374. HMI 1382 may communicate with BSC 1374 on an Ethernet connection.

BSC 1374 may process information relating to a location of vehicle 1301, information relating to a voltage warning, information relating to a charge system status and a charge fault status, and/or a customer interaction status to create a signal. The signal created or otherwise generated by BSC 1374 is provided as a command signal to a body control module (BCM) 1376, e.g., on a bus such as a CAN bus. The command signal may be a daytime running light command such as a halolight command signal, a turn signal command signal, and/or a beam command signal.

BCM 1376 may provide the command signal obtained from BSC 1374 to a headlight control system 1378 on a bus such as a body CAN bus. Light control system 1378 may be arranged to control at least headlight 1328. In one embodiment, headlight control system 1378 may be arranged to control more than one headlight 1328. Alternatively, vehicle 1301 may include more than one headlight control system 1378 such that each headlight control system 1378 controls a separate headlight 1328.

Headlight 1328 includes a first headlamp arrangement 1368 that includes a daytime running light arrangement 1380a, a turn signal arrangement 1380b, and a position light arrangement 1380c. Light control system 1378, which may be a headlight control system, is configured to activate arrangements 1380a-c as appropriate. For example, if the command signal or instruction from BSC 1374 indicates that daytime running light arrangement 1380a is to be activated, then light control system 1378 may activate daytime running light 1380a. Similarly, if the command signal or instruction from BSC 1374 indicates that turn signal 1380b or position light 1380c are to be activated, then headlight control system 1378 may activate turn signal 1380b or position light 1380c, respectively.

In general, information obtained by BSC 1374 may be processed to determine when and how to activate headlight 1328. By way or example, if BSC 1374 determines that vehicle 1301 is in a park gear or state, that environmental conditions are precipitation free and relatively bright, and, further, that no interaction has occurred with HMI 1382, logic associated with BSC 1374 may send a signal to headlight control system 1378 which indicates that daytime running light 1380a is to be activated in a breathing pattern to substantially create a breathing effect.

It should be appreciated that in some embodiments, a taillight or rear light of a vehicle may be used to communicate information. In one embodiment, a taillight may be substantially coupled to a headlight such that the taillight and the headlight may exhibit the same behavior to substantially communicate the same information.

a diagrammatic representation of a back of an autonomous vehicle with taillights or rear lights that may be used to communicate in accordance with an embodiment. An autonomous vehicle 1401 includes taillights 1490a, 1490b. Taillights 1490a, 1490b are generally configured to be on when headlights (not shown) of vehicle 1401 are on, as well as to function as turn signals. In one embodiment, when headlights (not shown) are used to communicate information, as for example through a breathing effect, taillights 1490a, 1490b may also perform a corresponding breathing effect. In another embodiment, taillights 1490a, 1490b may perform a breathing effect or, more generally, communicate information even when headlights (not shown) are not communicating information. That is, taillights 1490a, 1490b may either cooperate with headlights (not shown) or may be used substantially independently from headlights.

Although only a few embodiments have been described in this disclosure, it should be understood that the disclosure may be embodied in many other specific forms without departing from the spirit or the scope of the present disclosure. By way of example, while the use of headlights to communicate information has been described as occurring substantially when the headlights are not in use as daytime running lights and/or while the vehicle is in gear, the use of headlights to communicate information may occur in some situations while the headlights are in use as daytime running lights and/or while the vehicle is in gear. The intensity of light emitted by headlights of a vehicle while the headlights are operational as daytime running lights may, for instance, be varied to indicate a particular situation associated with the vehicle. In other words, the use of vehicle headlights to convey information is not limited to use while the headlights are not in use as daytime running lights and/or while the vehicle is in gear.

Generally, a breathing effect may be implemented using at least one headlight by varying an intensity of light emitted by the headlight between a first intensity and a second intensity. In one embodiment, varying the intensity of light may include the intensity of emitted light substantially oscillating or varying linearly between the first intensity and the second intensity. In another embodiment, varying the intensity of light may include the intensity of emitted light varying between a first intensity and a second intensity, such that the intensity of emitted light increases from the first intensity to the second intensity, then decreases from the second intensity to the first intensity, etc. Generally, a breathing effect may be implemented by varying a characteristic of an optical arrangement, e.g., a headlight and/or a taillight, substantially back and forth between a low value and a high value. The characteristic may be, but is not limited to being, an intensity and/or a brightness of the optical arrangement. Varying the characteristic between the low value and the high value may involve continuously varying the characteristic in any suitable manner, as for example sinusoidally or linearly, or discretely varying the characteristic such that the characteristic is either at the low value, the high value, or at a default value.

Headlights may be configured to have the capability to provide lights of different wavelengths and/or colors. When headlights on a vehicle are capable of emanating or emitting light of different wavelengths and/or colors, different colors may be used to communicate particular information associated with a state and/or a situation associated the vehicle. For example, different shades of a particular color may be emitted by a headlight to indicate a level of charge associated with a vehicle while the vehicle is charging such that a lighter or duller shade of the color indicates a lower charge level while a darker or brighter shade of the color indicates a higher charge level.

Headlights may emit lights of different colors to effectively communicate particular situations. A light in a white wavelength may indicate that there is no issue with the vehicle, while a light in an amber wavelength may indicate that there is an issue with the vehicle. For example, a headlight on a vehicle may emit light of an amber color when there is an issue, e.g., a fault or a need for a vehicle to be charged. A solid amber light may indicate a charge error, while a periodic double blink of an amber light may indicate a need for charging. Similarly, a flashing amber light may indicate a hazard. Headlights may have widely varied intensities, e.g., intensities in a range of between approximately zero lumens and approximately 10,000 lumens such as intensities between approximately 2,000 lumens and approximately 4,000 lumens.

Lights, e.g., exterior lights, other than headlights and taillights on a vehicle may be used to convey information. Other lights may include, but are not limited to including, reverse lights and position lights. It should be appreciated that auxiliary lights may also be placed on an exterior of a vehicle, and that such lights may also, or alternatively, be used to convey information.

In one embodiment, audio indications may be provided in addition to visual indications provided by a headlight. That is, an audible indication may be provided in addition to visual indications to provide information to an observer such as a customer. For instance, an amplifier with a speaker mounted on or within a vehicle may provide an audible indication that effectively complements a visual indication. A flashing headlight and an audible indication such as a particular tone may be substantially synchronized to provide additional contextual information to an observer.

As discussed above, logic associated with a vehicle, e.g., logic associated with a BSC or a headlight controller of a vehicle, may determine how to activate an arrangement associated with a headlight. Different conditions may be defined to activate an arrangement associated with a headlight. In other words, patterns associated with different conditions may vary widely without departing from the spirit or the scope of the disclosure. For example, when a BSC determines a location of a vehicle from a compute system indicates a delivery location and that the vehicle is in a park gear, and signals from an HMI of the vehicle indicate that no user has interacted with the HMI, a breathing effect may be activated using at least one daytime running light. As another example, when a BSC obtains a location of a depot or location at which the vehicle may be serviced from a compute system and an indication that the vehicle is in a park gear, and the BSC also obtains a fault charge system status from a CDU, a double blink with a long pause may be activated using at least one turn signal. In yet another example, when a BSC determines a location of the vehicle, determines that there is rain and/or a relatively low ambient light intensity, determines that the vehicle is in a park gear, and identifies signals from an HMI of the vehicle which indicate that the vehicle is awaiting customer interaction, a breathing effect may be initiated using a position light arrangement of a headlight.

In general, different behaviors may be defined for different headlamp arrangements or systems that are part of an overall headlight or optical arrangement. By way of example, one set of behaviors may be defined for a daytime running light, another set of behaviors may be defined for a turn signal, and yet another set of behaviors may be defined for a position light. Behaviors may be associated with environmental conditions. For instance, a daytime running light may be used to provide information using particular patterns and/or light intensities when there is no rain and/or ambient light is relatively bright, and a position light may be used to provide information using particular patterns and/or light intensities when there is rain and/or ambient light is relatively low. In one embodiment, a turn signal may be used to provide information using particular patterns regardless of environmental conditions, when a vehicle is identified as being at a location suitable for charging the vehicle or when a charge error is detected.

When headlamps and/or taillights have behaviors that include using particular patterns and/or light intensities, the patterns may generally include timing aspects. For instance, when substantially cycling between lower and higher light intensities, the patterns may effectively hold particular light intensities for predetermined periods of time before transitioning to other light intensities.

While using headlights of a vehicle to convey information to an observer has been described as being suitable when the vehicle is in a park gear or otherwise parked, it should be appreciated that initiating the use of headlights to convey information is not limited to being associated with the vehicle being in a park gear or otherwise parked. Using headlights to convey information may be triggered upon a vehicle determining that a customer has been notified that the vehicle has arrived at a predetermined location.

In one embodiment, information relating to charging a vehicle may be conveyed by a headlight and a corresponding taillight on the same side of the vehicle as a charge port. By way of example, if a charge port of a vehicle is on the left side of the vehicle, the left headlight and/or the left taillight may be used to communicate information such as a need for charging or a status of an ongoing charge process.

An autonomous vehicle has generally been described as a land vehicle, or a vehicle that is arranged to be propelled or conveyed on land. It should be appreciated that in some embodiments, an autonomous vehicle may be configured for water travel, hover travel, and or/air travel without departing from the spirit or the scope of the present disclosure. In general, an autonomous vehicle may be any suitable transport apparatus that may operate in an unmanned, driverless, self-driving, self-directed, and/or computer-controlled manner.

The embodiments may be implemented as hardware, firmware, and/or software logic embodied in a tangible, i.e., non-transitory, medium that, when executed, is operable to perform the various methods and processes described above. That is, the logic may be embodied as physical arrangements, modules, or components. For example, the systems of an autonomous vehicle, as described above with respect to FIG. 3, may include hardware, firmware, and/or software embodied on a tangible medium. A tangible medium may be substantially any computer-readable medium that is capable of storing logic or computer program code which may be executed, e.g., by a processor or an overall computing system, to perform methods and functions associated with the embodiments. Such computer-readable mediums may include, but are not limited to including, physical storage and/or memory devices. Executable logic may include, but is not limited to including, code devices, computer program code, and/or executable computer commands or instructions.

It should be appreciated that a computer-readable medium, or a machine-readable medium, may include transitory embodiments and/or non-transitory embodiments, e.g., signals or signals embodied in carrier waves. That is, a computer-readable medium may be associated with non-transitory tangible media and transitory propagating signals.

The steps associated with the methods of the present disclosure may vary widely. Steps may be added, removed, altered, combined, and reordered without departing from the spirit of the scope of the present disclosure. For example, a vehicle has been described as operating with headlights on in FIG. 6. It should be appreciated that the vehicle may instead operate with headlights off, as for example when daytime running lights are not desired. Therefore, the present examples are to be considered as illustrative and not restrictive, and the examples are not to be limited to the details given herein, but may be modified within the scope of the appended claims.

What is claimed is:

1. An apparatus comprising:
   a chassis;
   a propulsion system coupled to the chassis, the propulsion system configured to propel the apparatus, the propulsion system including a drive gear and a park gear;
   a sensor system coupled to the chassis, the sensor system configured to obtain data associated with the apparatus;
   a processing arrangement carried on the chassis, the processing arrangement configured to process the data; and
   a light system coupled to the chassis, the light system including at least a first optical assembly and at least a first optical controller, wherein the light system is arranged to obtain at least one command from the processing arrangement and to execute the command using the first optical assembly to cause the first optical assembly to communicate a first indication by varying an intensity of light emitted by the first optical assembly, the first indication being arranged to indicate a current status of the apparatus when the park gear is engaged, the current status being at least one selected from a group including awaiting an input and awaiting a charge.

2. The apparatus of claim 1 wherein the apparatus is a vehicle, wherein the light system is arranged to obtain the at least one command from the processing arrangement and to execute the command using the first optical assembly when the park gear is engaged.

3. The apparatus of claim 2 wherein the first optical assembly includes a daytime running light system, a turn signal system, and a position light system, and wherein the first command indicates whether the daytime running light system, the turn signal system, or the position light system is to communicate the first indication.

4. The apparatus of claim 3 wherein the data identifies whether the park gear is engaged.

5. The apparatus of claim 4 further including:
   a power system, the power system being arranged to provide power to the apparatus, the power system including a battery arranged to be charged, wherein the first indication is arranged to indicate that the battery is fully charged, and wherein the daytime running light system communicates the first indication by maintaining a first intensity level when the park gear is engaged.

6. The apparatus of claim 4 further including:
a power system, the power system being arranged to provide power to the apparatus, the power system including a battery arranged to be charged, wherein when the current status is awaiting the charge, the first indication is further arranged to indicate an issue associated with the battery, and wherein the turn signal communicates the first indication by blinking when the park gear is engaged.

7. The apparatus of claim 2 wherein the first optical assembly includes a daytime running light system, and wherein the first indication is arranged to indicate that the vehicle is awaiting a first action, wherein the first optical assembly communicates the first indication by varying the intensity of light emitted by the daytime running light system by increasing the intensity of the light between a first intensity and a second intensity and by decreasing the intensity of the light between the second intensity and the first intensity.

8. The apparatus of claim 7 wherein the vehicle includes a human machine interface (HMI), and wherein the first action is the input, the input being obtained by the HMI.

9. The apparatus of claim 2 wherein the command is provided to the first optical assembly by the first optical controller, and wherein the first indication is arranged to indicate that the vehicle is awaiting a first action, wherein the first optical assembly communicates the first indication by varying the intensity of light emitted by the first optical assembly between a first intensity and a second intensity.

10. A method comprising: operating a vehicle, wherein the vehicle has a park gear arranged to be engaged to cause the vehicle to be in a parked state, and wherein the vehicle includes a first optical assembly that has a first optical arrangement and a first optical controller, the first optical arrangement including headlights, wherein the first optical arrangement further includes at least a daytime running light and a turn signal; determining a status of the vehicle by a command from a processing arrangement of the vehicle processing data from a sensor of the vehicle, the status being at least one selected from a group including awaiting an input and awaiting a charge; and varying an intensity of light emitted from the first optical arrangement to provide a first indication, the first indication being arranged to indicate the status of the vehicle, wherein varying the intensity of the light emitted by the first optical arrangement to provide the first indication includes activating the daytime running light or the turn signal when the park gear is engaged.

11. The method of claim 10 wherein the vehicle includes a human machine interface (HMI) and the first indication is an indication that the HMI is awaiting the input.

12. The method of claim 11 wherein varying the intensity of light emitted by the first optical arrangement includes causing the intensity of light emitted by the first optical arrangement to vary between a first intensity and a second intensity when the park gear is engaged.

13. The method of claim 10 wherein the first optical arrangement varies the intensity of light emitted from the first optical arrangement back and forth between a first intensity level and a second intensity level to provide the first indication when the status of the vehicle indicates that the vehicle is in the parked state.

14. The method of claim 10 wherein the vehicle includes a human machine interface (HMI) and the first optical arrangement varies the intensity of light emitted to provide the first indication when the status of the vehicle indicates that the vehicle is in the parked state, the status of the vehicle further indicating that the HMI is awaiting the input, and wherein varying the intensity of light emitted by the first optical arrangement to provide the first indication includes varying an intensity of light emitted by the daytime running light.

15. The method of claim 10, wherein the vehicle includes a chargeable battery arranged to provide power to the vehicle, the first optical arrangement varies the intensity of light emitted to provide the first indication when the status of the vehicle indicates that the vehicle is in the parked state, varying the intensity of light emitted by the first optical arrangement to provide includes causing the daytime running light system to emit light at a first intensity level, and wherein awaiting the charge includes awaiting charging of the chargeable battery.

16. The method of claim 10, wherein the vehicle includes a chargeable battery arranged to provide power to the vehicle, the first optical arrangement varies the intensity of light emitted to provide the first indication when the status of the vehicle indicates that the vehicle is in the parked state, wherein varying the intensity of light emitted by the first optical arrangement to provide the first indication includes causing the turn signal to blink, and wherein awaiting the charge includes awaiting charging of the chargeable battery.

* * * * *